(12) United States Patent
Haga et al.

(10) Patent No.: US 10,181,766 B2
(45) Date of Patent: Jan. 15, 2019

(54) MOTOR INCLUDING BUS BARS AND BUS BAR HOLDER

(71) Applicant: Nidec Corporation, Kyoto (JP)

(72) Inventors: Hidehiro Haga, Kyoto (JP); Ryusuke Sato, Kyoto (JP); Masashi Sonoda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/472,323

(22) Filed: Mar. 29, 2017

(65) Prior Publication Data

US 2017/0201150 A1    Jul. 13, 2017

Related U.S. Application Data

(63) Continuation of application No. PCT/JP2015/076571, filed on Sep. 17, 2015.

(30) Foreign Application Priority Data

Sep. 30, 2014    (JP) .................................. 2014-201415

(51) Int. Cl.
*H02K 3/28* (2006.01)
*H02K 3/50* (2006.01)
(Continued)

(52) U.S. Cl.
CPC ............. *H02K 5/225* (2013.01); *H02K 3/28* (2013.01); *H02K 3/50* (2013.01); *H02K 3/522* (2013.01);
(Continued)

(58) Field of Classification Search
CPC ............ H02K 3/28; H02K 3/50; H02K 3/522; H02K 5/225; H02K 7/083; H02K 11/21; H02K 11/215; H02K 2203/03
(Continued)

(56) References Cited

U.S. PATENT DOCUMENTS 6,931,957 B2    8/2005    Saito et al.
7,215,115 B2    5/2007    Saito et al.
(Continued)

FOREIGN PATENT DOCUMENTS

JP    2004-248492 A    9/2004
JP    2007-006592 A    1/2007
(Continued)

OTHER PUBLICATIONS

Official Communication issued in corresponding International Application PCT/JP2015/069676, dated Sep. 29, 2015.
(Continued)

*Primary Examiner* — John K Kim
(74) *Attorney, Agent, or Firm* — Keating & Bennett, LLP

(57) ABSTRACT

A motor includes a rotor with a shaft, a stator, first and second bearings supporting the shaft, a bus bar assembly holding the second bearing, a circuit board, a sensor magnet fixed to the shaft, and a rotation sensor which is attached to the circuit board and faces a direction. The bus bar assembly includes a bus bar and a bus bar holder. The bus bar holder includes a cylindrical main body portion including an opening at a second side. The bus bar includes a coil connection portion that protrudes from an inner surface of the main body portion and is electrically connected to a coil of the stator. The end of the second side of the coil connection portion is located at a second side ahead of a surface of a first side of the circuit board.

7 Claims, 5 Drawing Sheets

(51) Int. Cl.
    *H02K 5/22*     (2006.01)
    *H02K 7/08*     (2006.01)
    *H02K 11/21*     (2016.01)
    *H02K 3/52*     (2006.01)
    *H02K 11/215*     (2016.01)

(52) U.S. Cl.
    CPC ............ *H02K 7/083* (2013.01); *H02K 11/21* (2016.01); *H02K 11/215* (2016.01); *H02K 2203/03* (2013.01)

(58) Field of Classification Search
    USPC .................................................. 310/68 B, 71
    See application file for complete search history.

(56) References Cited

U.S. PATENT DOCUMENTS

| | | | |
|---|---|---|---|
| 7,427,860 | B2 | 9/2008 | Saito et al. |
| 7,588,444 | B2 | 9/2009 | Kataoka et al. |
| 7,990,001 | B2 | 8/2011 | Hatano et al. |
| 8,520,394 | B2* | 8/2013 | Wakita ................ B62D 5/0406 165/104.33 |
| 8,729,754 | B2 | 5/2014 | Fujii et al. |
| 8,963,388 | B2 | 2/2015 | Miyachi et al. |
| 9,045,156 | B2 | 6/2015 | Omae et al. |
| 9,509,196 | B2 | 11/2016 | Yongzuo et al. |
| 2009/0079280 | A1* | 3/2009 | Terauchi ................ H02K 5/225 310/71 |
| 2012/0014070 | A1* | 1/2012 | Wakita ................ B62D 5/0406 361/720 |
| 2012/0175980 | A1* | 7/2012 | Zhang .................... H02K 5/145 310/71 |
| 2013/0099609 | A1* | 4/2013 | Ikeno .................... H02K 29/08 310/52 |
| 2015/0171712 | A1* | 6/2015 | Yongzuo ............ H02K 11/0094 310/71 |
| 2015/0357886 | A1 | 12/2015 | Ishizeki et al. |
| 2017/0201150 | A1* | 7/2017 | Haga ........................ H02K 3/50 |

FOREIGN PATENT DOCUMENTS

| | | | |
|---|---|---|---|
| JP | 2007-185055 | A | 7/2007 |
| JP | 2007-221976 | A | 8/2007 |
| JP | 2007-221977 | A | 8/2007 |
| JP | 2010-161863 | A | 7/2010 |
| JP | 2010-172086 | A | 8/2010 |
| JP | 4552254 | B2 | 9/2010 |
| JP | 2013-153633 | A | 8/2013 |
| JP | 2013-247761 | A | 12/2013 |
| JP | 5386072 | B2 | 1/2014 |

OTHER PUBLICATIONS

Official Communication issued in corresponding International Application PCT/JP2015/076570, dated Dec. 8, 2015.
Official Communication issued in corresponding International Application PCT/JP2015/069677, dated Oct. 6, 2015.
Official Communication issued in corresponding International Application PCT/JP2015/069678, dated Sep. 15, 2015.
Official Communication issued in corresponding International Application PCT/JP2015/076571, dated Dec. 25, 2015.
Official Communication issued in corresponding International Application PCT/JP2015/076569, dated Dec. 22, 2015.
Haga, H. et al.; "Motor"; U.S. Appl. No. 15/472,320, filed Mar. 29, 2017.
Haga, H. et al.; "Motor"; U.S. Appl. No. 15/472,321, filed Mar. 29, 2017.
Haga, H. et al.; "Motor"; U.S. Appl. No. 15/472,349, filed Mar. 29, 2017.
Haga, H. et al.; "Motor"; U.S. Appl. No. 15/472,322, filed Mar. 29, 2017.
Haga, H. et al.; "Motor"; U.S. Appl. No. 15/472,324, filed Mar. 29, 2017.

* cited by examiner

MOTOR INCLUDING BUS BARS AND BUS BAR HOLDER

CROSS REFERENCE TO RELATED APPLICATIONS

This application claims the benefit of priority to Japanese Patent Application No. 2014-201415 filed on Sep. 30, 2014 and is a Continuation Application of PCT Application No. PCT/JP2015/076571 filed on Sep. 17, 2015. The entire contents of each application are hereby incorporated herein by reference.

BACKGROUND OF THE INVENTION

1. Field of the Invention

The present invention relates to a motor.

2. Description of the Related Art

Recently, a structure in which at least one electronic component is integrated with the motor has been proposed to increase responsiveness of the motor. In this motor, if the number of electronic components is increased, there is a method for using a board to which electronic components are mounted.

In the above-mentioned motor, a stator, a rotor, and the board including electronic components are installed in the housing. Therefore, a space between the electronic components installed in the housing may be markedly reduced. In addition, the housing includes a large number of electronic components, such that arrangement between the electronic components becomes complicated. Therefore, the assembling of the electronic components becomes complicated such that productivity of the motor may be reduced. However, in recent times, improvement of responsiveness of the motor is needed.

SUMMARY OF THE INVENTION

In accordance with one preferred embodiment of the present invention, a motor includes a rotor including a shaft with a center on a center axis extending in one direction; a stator enclosing the rotor and rotating the rotor about the center axis; a first bearing which is disposed at a first side in the one direction of the stator and supports the shaft; a second bearing which is disposed at a second side opposite to the first side of the stator and supports the shaft; and a cylindrical housing holding the stator and the first bearing; a bus bar assembly holding the second bearing, and allowing an end of the first side to be located in the housing; a cover fixed to the housing to cover at least a portion of the second side of the bus bar assembly; a circuit board between the second bearing and the cover in the one direction and allowing a surface of the second side to cross the one direction; a sensor magnet directly or indirectly fixed to the shaft at the second side of the second bearing; and a rotation sensor which is attached to the circuit board, and faces the sensor magnet in the one direction; wherein the bus bar assembly includes a bus bar electrically connected to the stator; a wiring member electrically connecting an external power supply to the circuit board; and a bus bar holder holding the bus bar and the wiring member, the bus bar holder includes a cylindrical main body portion including an opening at the second side; and a connector portion protruding from the main body portion toward a radially outer side of the center axis, the wiring member includes an external power-supply connection terminal provided to the connector portion to be electrically connected to the external power-supply; and a circuit board connection terminal electrically connected to the circuit board, the bus bar includes a coil connection portion that protrudes from an inner surface of the main body portion and is electrically connected to a coil of the stator, and the end of the second side of the coil connection portion is located at the second side ahead of a surface of the first side of the circuit board.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Motors according to preferred embodiments of the present invention will hereinafter be described with reference to the attached drawings. Further, the scope of the present invention is not limited to the following preferred embodiments, but may be arbitrarily changed within the technical spirit of the present invention. To easily understand each component in the following drawings, actual structures, and a scale of each structure, the number of structures, etc., may be different.

Figure 1:
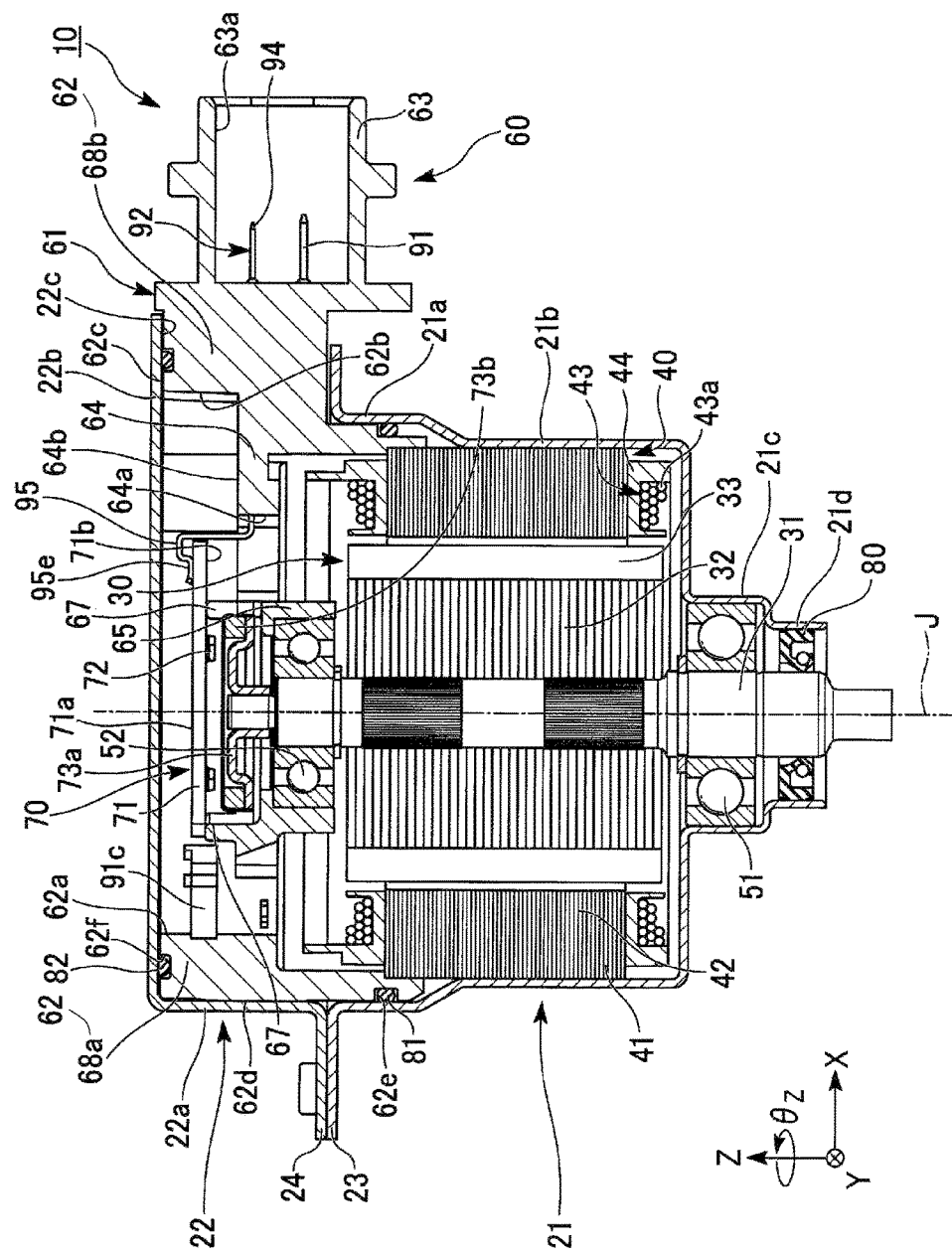
FIG. 1 is a cross-sectional view illustrating a motor according to a first preferred embodiment of the present invention.

In the drawings, an X-Y-Z coordinate system is provided as an appropriate three-dimensional (3D) perpendicular coordinate system. In the X-Y-Z coordinate system, a direction parallel to the axial direction (one direction) of a center axis J shown in FIG. 1 will hereinafter be referred to as a Z-axis direction. A direction parallel to a longitudinal direction of a bus bar assembly 60 shown in FIG. 1, that is, the left-and-right direction of FIG. 1, is referred to as an X-axis direction. A direction parallel to a width direction of the bus bar assembly 60, that is, a direction perpendicular to both the X-axis direction and the Z-axis direction, is referred to as a Y-axis direction.

In the following description, a positive side of the Z-axis direction (+Z side, a second side) will hereinafter be defined as a "rear side" and a negative side of the Z-axis direction (−Z side, a first side) will hereinafter be defined as a "front side." It is to be understood that the descriptions of the rear side and the front side are used for explanation only, and they do not limit the actual location relation or direction. Also, unless otherwise explained, a direction parallel to the center axis J (Z-axis direction) is simply referred to as an "axial direction," a radial direction having its center on the center axis J is simply referred to as a "radial direction," and a circumferential direction having its center on the center axis J, that is, the axial circumference of center axis J (θZ direction), is simply referred to as a "circumferential direction."

Further, herein, descriptions such as being axially extended do not only refer to a case of strictly being extended in the axial direction (Z-axis direction), but it may also include the other case of being extended in a direction inclined at less than 45° relative to the axial direction. Also, descriptions such as being radially extended do not only refer to a case of strictly being extended in the radial direction, that is, the direction perpendicular to the axial direction (Z-axis direction), but it may also include a case of being extended in a direction inclined at less than 45° relative to the radial direction.

Figure 2:
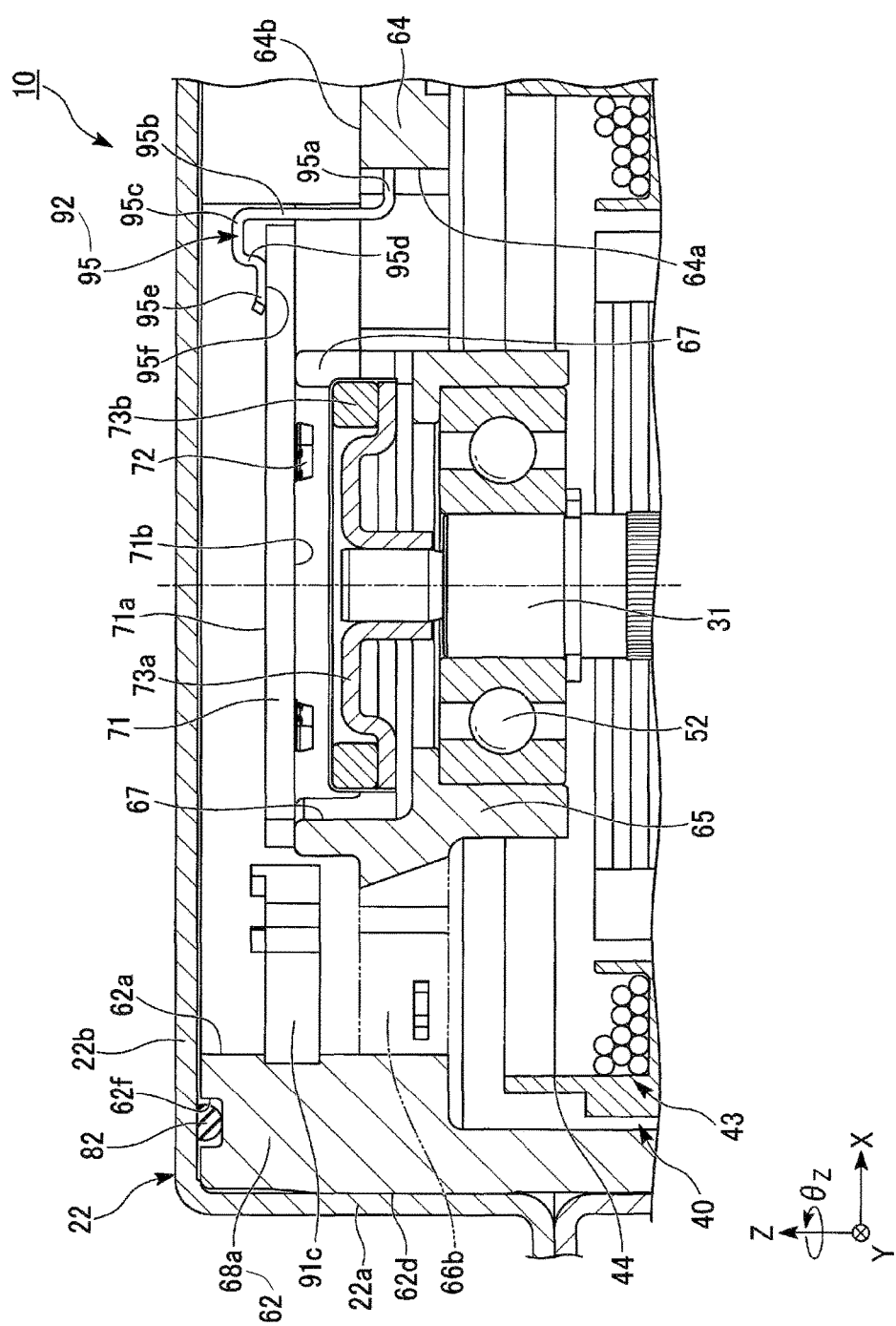
FIG. 2 is a partially enlarged cross-sectional view illustrating the motor according to a first preferred embodiment of the present invention.

FIG. 1 is a cross-sectional view illustrating a motor 10 according to a preferred embodiment of the present invention. FIG. 2 is a cross-sectional view illustrating a portion of the motor 10, and is a partially enlarged view of the motor shown in FIG. 1. The motor 10 according to the present preferred embodiment is a brushless motor. As illustrated in FIG. 1, the motor 10 preferably includes a housing 21, a cover 22, a rotor 30 having a shaft 31, a stator 40, a first bearing 51, a second bearing 52, a controller 70, a bus bar assembly 60, and a plurality of O-rings. The plurality of O-rings preferably includes a front side O-ring 81 and a rear side O-ring 82.

The rotor 30, the stator 40, the first bearing 51, and the oil seal 80 are accommodated into the housing 21. The housing 21 is opened toward the rear side (+Z side). An end of the front side (−Z side) of the bus bar assembly 60 is inserted into the opening of the housing 21. The bus bar assembly 60 holds the second bearing 52. The first bearing 51 and the second bearing 52 support both sides of the axial direction (Z-axis direction) of the shaft 31.

The cover 22 covers at least a portion of the rear side (+Z side) of the bus bar assembly 60. The cover 22 is fixed to the housing 21. The cover 22 preferably includes a cylindrical portion 22a, a cover portion 22b, a front surface 22c of the cover, and a rear side flange portion 24. The controller 70 is located between the second bearing 52 and the cover 22. The front side O-ring 81 is located between the bus bar assembly 60 and the housing 21. The rear side O-ring 81 is located between the bus bar assembly 60 and the cover 22. The above-mentioned components will hereinafter be described in greater detail below.

The housing 21 is preferably a cylindrical or substantially cylindrical member, and holds the stator 40 and the first bearing 51. In a preferred embodiment of the present invention, the housing 21 preferably has a multi-stepped cylindrical shape or a substantially multi-stepped cylindrical shape with open ends on both sides. In this preferred embodiment, a material of the housing 21 is, for example, metal. In more detail, it is preferred that a material of the housing 21 is, for example, aluminum, iron alloy, or the like.

The housing 21 preferably includes a front side flange portion 23, a bus bar assembly insertion portion 21a, a stator holding portion 21b, a front bearing holding portion 21c, and an oil seal holding portion 21d. The front side flange portion 23, the bus bar assembly insertion portion 21a, the stator holding portion 21b, the front bearing holding portion 21c, and the oil seal holding portion 21d are disposed in a direction from the rear side (+Z side) to a front side (−Z side) along the axial direction (Z-axis direction). That is, in the housing 21, the front side flange portion 23 is preferably disposed at a rearmost side and the oil seal holding portion 21d is preferably disposed at a frontmost side. Each of the bus bar assembly insertion portion 21a, the stator holding portion 21b, the front bearing holding portion 21c, and the oil seal holding portion 21d preferably has a concentric cylindrical or substantially cylindrical shape. Diameters of the above members are reduced in the order of the bus bar assembly insertion portion 21a, the stator holding portion 21b, the front bearing holding portion 21c, and the oil seal holding portion 21d.

The front side flange portion 23 extends from the end of the rear side (+Z side) of the bus bar assembly insertion portion 21a toward a radially outer side. That is, the housing 21 includes a housing flange portion 23 at the end of the rear side. The bus bar assembly insertion portion 21a encloses an end of a front side (−Z side) of the bus bar assembly 60 from the radially outer side of the center axis J. In other words, at least a portion of the end of the front side (−Z side) of the bus bar assembly 60 is disposed in the bus bar assembly insertion portion 21a. That is, the end of the front side of the bus bar assembly 60 is disposed in the housing 21.

An outer surface of a stator 40 (preferably an outer surface of a core back portion 41, to be described later) is fitted into an inner surface of the stator holding portion 21b. Accordingly, the stator 40 is fixed to the housing 21. The front bearing holding portion 21c holds the first bearing 51. In this preferred embodiment, the inner surface of the front bearing holding portion 21c is fitted into the outer surface of the first bearing 51. The oil seal 80 is held in the oil seat holding portion 21d.

The rotor 30 preferably includes a shaft 31, a rotor core 32, and a rotor magnet 33. The shaft 31 has its center on the center axis J which extends in one direction (Z-axis direction). According to this preferred embodiment, the shaft 31 is a cylindrical or substantially cylindrical member. Further, the shaft 31 may be a solid member or a hollow cylindrical member. The shaft 31 is rotatably supported around the axis (in ±θZ direction) by the first bearing 51 and the second bearing 52. The end of the front side (−Z side) of the shaft 31 protrudes to the outside of the housing 21. In the oil seal holding portion 21d, the oil seal 80 is disposed around the axis of the shaft 31.

The rotor core 32 is preferably a cylindrical or substantially cylindrical member. The rotor core 32 is fixed to the shaft 31 while enclosing the shaft 31 around the axis (in the θZ direction). In more detail, the rotor core 32 preferably includes a through-hole which penetrates axially through the rotor core 32. At least a portion of the shaft 31 is disposed within the through-hole of the rotor core 32. The shaft 31 is fixed to the rotor core 32 by, for example, press-fitting, adhesion, or the like. The rotor magnet 33 is fixed to an outer surface along an axis circumference of the rotor core 32. In more detail, according to this preferred embodiment, the rotor magnet 33 preferably has an annular or substantially annular shape. The outer surface of the rotor core 32 faces the inner surface of the rotor magnet 33. The rotor magnet 33 is fixed to the rotor core 32 by, for example, an adhesive, or the like. Further, the shape of the rotor magnet 33 is not necessarily annular. The rotor magnet 33 may be defined by a plurality of magnets arranged on an outer circumferential surface of the rotor core 32 in a circumferential direction. The rotor core 32 and the rotor magnet 33 rotate integrally with the shaft 31.

The stator 40 preferably has a cylindrical or substantially cylindrical shape. The rotor 30 is located in the stator 40. In other words, the stator 40 encloses the rotor 30 around the axis (in the θZ direction). The stator 40 rotates the rotor 30 in the circumferential direction of the center axis J The stator 40 preferably includes a core back portion 41, a plurality of teeth portions 42, a plurality of coils 43, and a plurality of bobbins 44. According to this preferred embodiment, the core back portion 41 and the teeth portion 42 is a stacked steel plate in which a plurality of electromagnetic steel plates are stacked.

The core back portion 41 may have a cylindrical or substantially cylindrical shape. Preferably, the shape of the core back portion 41 is concentric with the shaft 31. The plurality of teeth portions 42 is disposed on an inner surface of the core back portion 41. Each teeth portion 42 extends from the inner surface of the core back portion 41 toward a radially inner side (that is, toward the shaft 31). Preferably, the teeth portions 42 are arranged at equal or substantially equal intervals in the inner surface of the core back portion 41 in the circumferential direction.

Preferably, the bobbin 44 is a cylindrical or substantially cylindrical member. Each bobbin 44 is respectively mounted on one of the teeth portions 42. Preferably, the bobbin 44 is defined by at least two members engaged from an axial direction. Each coil 43 is disposed in each bobbin 44. Each coil 43 is provided by preferably winding a conductive wire 43*a* about a bobbin 44. Further, as the conductive wire 43*a*, a circular wire or a flat wire is preferably used.

The first bearing 51 is disposed at a front side (−Z side) of the stator 40. The first bearing 51 is held by the front bearing holding portion 21*c*.

The second bearing 52 is disposed at the rear side (+Z side) opposite to the front side of the stator 40. The second bearing 52 is held by a rear bearing holding portion 65 of a bus bar holder 61 which will be described later. In this preferred embodiment, a portion of the front side (−Z side) of the second bearing 52 preferably overlaps with the stator 40 in the radial direction. In more detail, a portion of the front side of the second bearing 52 overlaps with the bobbin 44 in the radial direction.

The first bearing 51 and the second bearing 52 supports the shaft 31. According to this preferred embodiment, each of the first bearing 51 and the second bearing 52 is a ball bearing. However, the type of the first bearing 51 and the second bearing 52 is not particularly limited to the above bearing type. For example, different kinds of bearings such as a sleeve bearing and a fluid hydraulic bearing may also be used. Further, the type of bearing of the first bearing 51 may be different from that of the second bearing 52.

The oil seal 80 preferably is an annular or substantially annular member. The oil seal 80 is mounted in the oil seal holding portion 21*d* around the axis (in the θZ direction) of the shaft 31. In more detail, the oil seal 80 is disposed in the oil seal holding portion 21*d*. An end of an axial lower portion of the shaft 31 penetrates through the through-hole of the oil seal 80. The oil seal 80 is disposed between the oil seal holding portion 21*d* and the shaft 31. Therefore, the oil seal 80 may prevent water, oil, etc., from infiltrating from a gap between the oil seal holding portion 21*d* and the shaft 31 into the housing 20. The oil seal 80 is preferably made of, for example, a resin material. However, a configuration and a material of the oil seal 80 are not limited thereto, and therefore an oil seal of different kinds of configurations and materials may also be used.

The controller 70 controls driving operations of the motor 10. The controller 70 preferably includes the circuit board 71, a rotating sensor 72, a sensor magnet holding member 73*a*, and a sensor magnet 73*b*. That is, the motor 10 includes the circuit board 71, the rotation sensor 72, the sensor magnet holding member 73*a*, and the sensor magnet 73*b*.

The circuit board 71 is disposed on an extending line of the rear side (+Z side) of the shaft 31. The circuit board 71 is disposed between the second bearing 52 and the cover 22 in the axial direction (Z-axis direction). The circuit board 71 includes a circuit board rear surface 71*a* located at the rear side and a circuit board front surface 71*b* located at the front side (−Z side). The circuit board rear surface 71*a* and the circuit board front surface 71*b* are a main surface of the circuit board 71. That is, the circuit board front surface 71*b* and the circuit board rear surface 71*a* intersect with the center axis (Z-axis). In this preferred embodiment, the main surface of the circuit board 71 is perpendicular to the center axis J (or Z-axis). The circuit board rear surface 71*a* faces the cover front surface 22*c*.

The circuit board 71 is supported by the end of the rear side (+Z side) of a plurality of circuit board support portions 67 to be described later. A printed wiring (not shown) is disposed in at least one side of the main surface of the circuit board 71. The circuit board 71 outputs, for example, a motor driving signal, etc.

The sensor magnet holding member 73*a* is an annular or substantially annular member. A hole at a center of the sensor magnet holding member 73*a* is fitted with a small diameter of the end of the rear side (+Z side) of the shaft 31. Accordingly, the position of the sensor magnet holding member 73*a* is determined on the basis of the shaft 31. Preferably, the sensor magnet holding member 73*a* is fixed to the shaft 31 by press-fitting, adhesion, etc. The sensor magnet holding member 73*a* may rotate along with the shaft 31.

The sensor magnet 73*b* preferably has an annular or substantially annular shape. An N pole and an S pole of the sensor magnet 73*b* are alternately disposed in the circumferential direction. The sensor magnet 73*b* is fitted on an outer circumferential surface of the sensor magnet holding member 73*a*. In more detail, at least a portion of the sensor magnet 73*b* comes in contact with the outer circumferential surface of the sensor magnet holding member 73*a*. Therefore, the sensor magnet 73*b* is fixed to the sensor magnet holding member 73*a*. As a result, the sensor magnet 73*b* is disposed at the circumference (±θZ direction) of the shaft 31 at the rear side (+Z side) of the second bearing 52 such that the sensor magnet 73*b* is able to rotate along with the shaft 31. That is, according to this preferred embodiment, the sensor magnet 73*b* is preferably indirectly fixed to the shaft 31 at the rear side of the second bearing 52. As illustrated in FIG. 2, a portion of the front side (−Z side) of the sensor magnet 73*b* overlaps with the connection portions 66*a*-66*d* (described later) in the radial direction.

At least one rotation sensor 72 is preferably mounted on the front surface 71*b* of the circuit board. That is, the rotation sensor 72 is preferably fixed to the circuit board 71. The rotation sensor 72 faces the sensor magnet 73*b* in the axial direction (Z-axis direction). The rotation sensor 72 detects the position of the rotor depending on a change in magnetic flux of the sensor magnet 73*b*. Although not illustrated, according to the preferred embodiment, three rotation sensors 72 are disposed on, for example, the front surface 71*b* of the circuit board. Further, as the rotation sensor 72, for example, a hall device, etc., is used.

Figure 3:
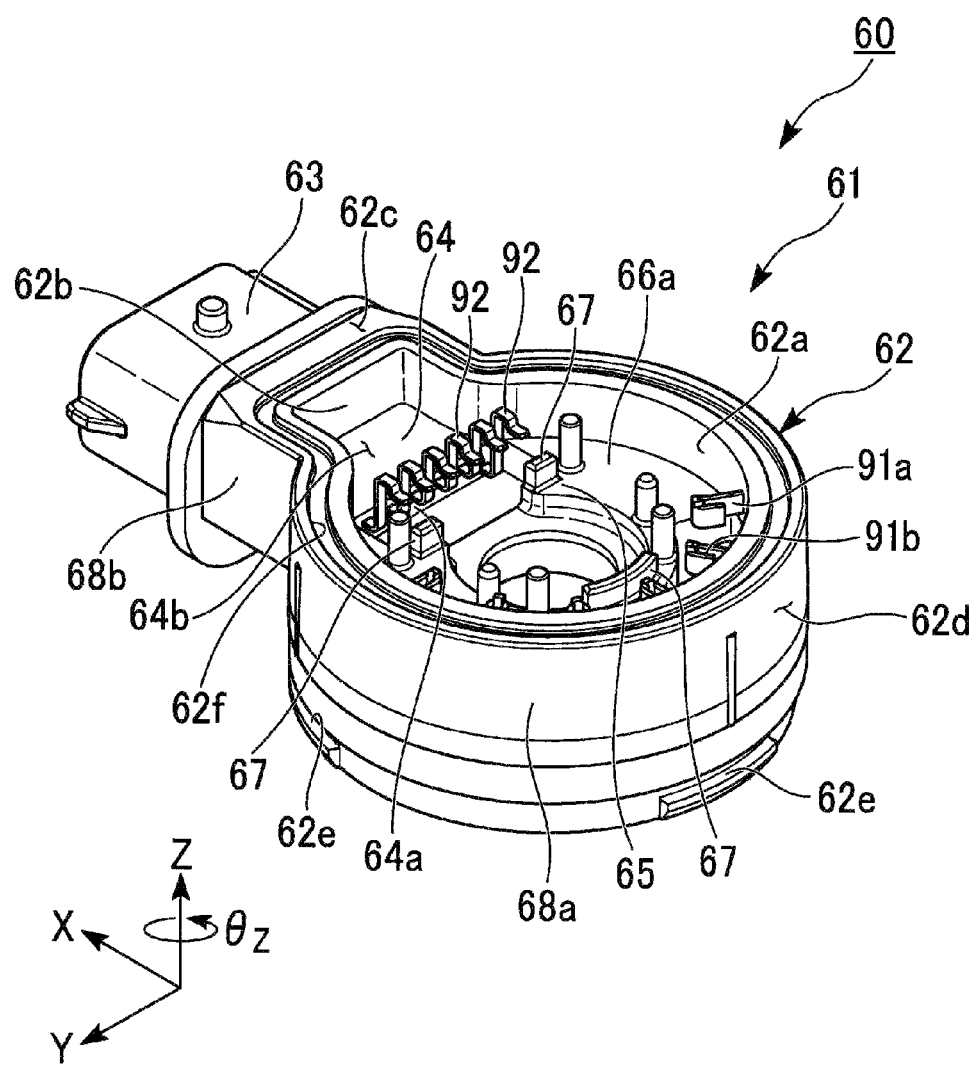
FIG. 3 is a perspective view illustrating a bus bar assembly according to a first preferred embodiment of the present invention.
Figure 4:
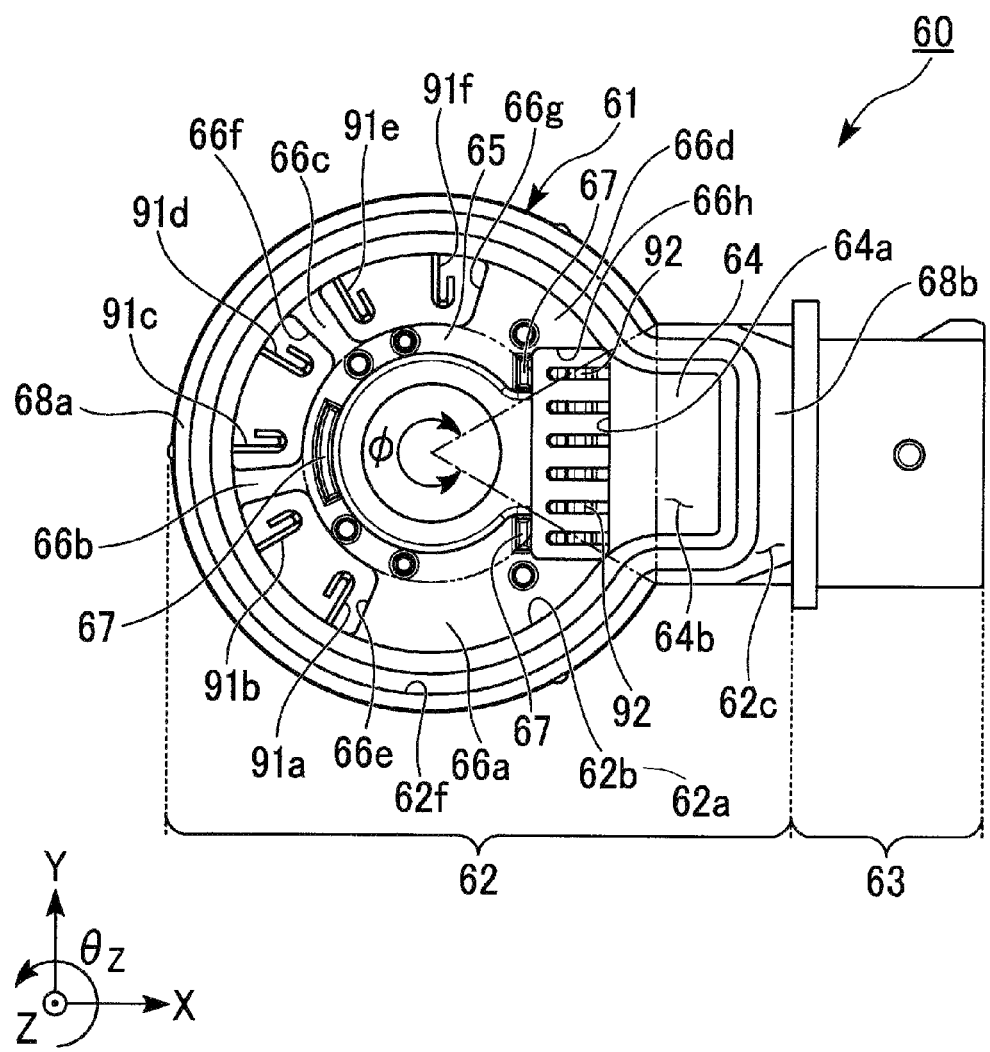
FIG. 4 is a plan view illustrating the bus bar assembly according to a first preferred embodiment of the present invention.

FIG. 3 is a perspective view illustrating the bus bar assembly 60. FIG. 4 is a plan view illustrating a bus bar assembly 60. The bus bar assembly 60 supplies a driving current from the external power source to the stator 40. As illustrated in FIGS. 1 to 4, the bus bar assembly 60 preferably includes a bus bar holder 61, at least one bus bar 91, and a wiring member 92. In addition, in this preferred embodiment, the bus bar assembly 60 includes a plurality of bus bars 91.

The bus bar holder 61 is preferably defined by a holder made of resin. Preferably, a material of the bus bar holder is an electrically insulating resin. The bus bar holder 61 holds the bus bar 91 and the wiring member 92. As illustrated in FIG. 1, a rear side (+Z side) of the bus bar holder 61 is accommodated in the cylindrical portion 22*a*. In this preferred embodiment, the bus bar holder 61 is press-fitted into the cylindrical portion 22*a* of the cover 22. At least a portion of a front side (−Z side) of the bus bar holder 61 is accommodated in the bus bar assembly insertion portion 21*a* of the housing 21.

As long as the bus bar holder 61 has electrically insulating properties, any material may be used without being specially limited. The bus bar holder 61 is preferably manufactured as a single monolithic member by, for example, injection molding. As illustrated in FIGS. 3 and 4, the bus bar holder 61 preferably includes a main body portion 62, a connector portion 63, a connection terminal holding portion 64, a second bearing holding portion 65 (hereinafter referred to as a rear bearing holding portion), connection portions 66*a*, 66*b*, 66*c*, and 66*d*, and a plurality of circuit board support portions 67.

As illustrated in FIGS. 1 and 3, the main body portion 62 preferably has a cylindrical or substantially cylindrical shape enclosing the center axis J in the circumferential direction (θZ direction). The main body portion 62 has an opening 62*a* at the rear side (+Z side) thereof. The main body portion 62 encloses the end of the rear side of the rotor 30 and the end of the rear side of the stator 40 in the circumferential direction. That is, a portion of the rear side of the rotor 30 and the stator 40 is located in the inner side of the front side (−Z side) of the main body portion 62.

A rear surface 62*c* of the main body portion is preferably provided with a groove portion 62*f*. The groove portion 62*f* extends along the contour of the main body portion 62 enclosing the opening 62*a*. A rear side O-ring 82 is fitted into the groove portion 62*f*. As illustrated in FIG. 3, the front side (−Z side) of the outer surface 62*d* of the main body portion 62 is provided with an O-ring holding portion 62*e*. As illustrated in FIG. 1, the front side O-ring 81 is fitted into the O-ring holding portion 62*e*.

As illustrated in FIGS. 3 and 4, the main body portion 62 preferably includes an arc portion 68*a* and a connector connection portion 68*b*. As illustrated in FIG. 4, the shape of a cross section (XY cross-section) perpendicular to the center axis J of the arc portion 68*a* and the shape of a plan view (XY plan view) are an arc shape concentric with the rear bearing holding portion 65. Preferably, a central angle of the arc shape may be φ240° or higher. In this preferred embodiment, the arc portion 68*a* is preferably press-fitted into the cylindrical portion 22*a* of the cover 22.

As illustrated in FIGS. 3 and 4, the connector connection portion 68*b* is a portion connected to the connector portion 63. The connector connection portion 68*b* is connected to both ends of the arc portion 68*a*. The connector connection portion 68*b* protrudes toward the connector portion 63 (+_X side).

The rear bearing holding portion 65 is disposed in the main body portion 62 along the radial direction. As illustrated in FIG. 2, the rear bearing holding portion 65 holds the second bearing 52. In this preferred embodiment, a portion of the front side (−Z side) of the rear bearing holding portion 65 overlaps with the stator 40 in the radial direction. In more detail, a portion of the front side (−Z side) of the rear bearing holding portion 65 overlaps with the bobbin 44 in the radial direction. Therefore, a portion of the front side of the second bearing 52 overlaps with the stator 40 in the radial direction.

As illustrated in FIG. 4, the connection portions 66*a*, 66*b*, 66*c*, and 66*d* connect the main body portion 62 to the rear bearing holding portion 65 disposed in the main body portion 62. The connection portions 66*a*-66*d* are positioned at the circumference of the rear bearing holding portion 65 while being spaced apart from each other at equal or substantially equal intervals along the circumferential direction.

Gaps 66*e*, 66*f*, 66*g*, and 66*h* are provided among the connection portions 66*a*-66*d* neighboring with each other in the circumferential direction. That is, gaps 66*e*, 66*f*, 66*g*, and 66*h* are provided between the rear bearing holding portion 65 and the main body portion 62. The gap 66*e* is defined by the connection portion 66*a*, the connection portion 66*b*, the main body portion 62, and the rear bearing holding portion 65. The gap 66*f* is defined by the connection portion 66*b*, the connection portion 66*c*, the main body portion 62, and the rear bearing holding portion 65. The gap 66*g* is defined by the connection portion 66*c*, the connection portion 66*d*, the main body portion 62, and the rear bearing holding portion 65. The gap 66*h* is defined by the connection portion 66*d*, the rear bearing holding portion 65, the connection portion 66*a*, the connection terminal holding portion 64, and the main body portion 62.

In a plan view, the position of the gap 66*e* is a position including coil connection portions 91*a* and 91*b* to be described later. In a plan view, the position of the gap 66*f* is a position including coil connection portions 91*c* and 91*d* to be described later. In a plan view, the position of the gap 66*g* is a position including coil connection portions 91*e* and 91*f* to be described later. In a plan view, the position of the gap 66*h* is a position including a circuit board connection terminal 95 to be described later. In a plan view, an outer diameter of the gap 66*h* preferably has a rectangular or substantially rectangular shape.

In FIG. 2, as illustrated by two-point chain lines, the connection portion 66*b* is preferably provided at the rear side (+Z side) ahead of the end of the front side (−Z side) of the rear bearing holding portion 65. The sensor magnet 73*b* is disposed at the radial inner side of the connection portion 66*b*. In this preferred embodiment, a portion of the rear side of the connection portion 66*b* overlaps with the sensor magnet 73*b* in the radial direction. In the above description, the connection portions 66*a*, 66*c*, and 66*d* is preferably identical in structure to the connection portion 66*b*.

As illustrated in FIGS. 3 and 4, the circuit board support portions 67 protrude from the surface of the rear side (+Z side) of the rear bearing holding portion 65 toward the rear side. In the example of FIG. 4, three circuit board support portions 67 are disposed on the surface of the rear side of the rear bearing holding portion 65. The circuit board support portion 67 supports the circuit board 71 at the end of the rear side.

The connector portion 63 is connected to external power supply (not shown). The connector portion 63 preferably has a rectangular parallelepiped cylindrical shape or substantially rectangular parallelepiped cylindrical shape opened toward the radially outer side (+X side). The connector portion 63 extends from a portion of the outer surface of the connector connection portion 68*b* to the radially outer side (+X side) of the center axis J. That is, the connector portion 63 protrudes from the main body portion 62 toward the radially outer side of the center axis J. As can be seen from FIG. 1, the entirety of the connector portion 63 is preferably exposed outside the cover 22.

As illustrated in FIG. 1, the connector portion 63 includes an opening 63*a* for power supply opened toward one side (+X side) disposed in a longitudinal direction of the bus bar holder 61. The bus bar 91 and an external power-supply connection terminal 94, described later, protrude from the bottom surface of the power-supply opening 63a.

As illustrated in FIGS. 3 and 4, the connection terminal holding portion 64 preferably has a rectangular parallelepiped or substantially rectangular parallelepiped shape. The connection terminal holding portion 64 protrudes toward the radially inner side from the inner surface 62b of the main body portion 62. In more detail, as illustrated in FIG. 4, the connection terminal holding portion 64 extends from the inner surface of the connector connection portion 68b in the direction (−X direction) opposite to the direction in which the connector portion 63 extends. The holding portion rear surface 64b is located at the front side ahead of the circuit board rear surface 71a. The holding portion rear surface 64b is located at the front side ahead of the rear surface 62c of the main body portion.

The bus bar 91 is a thin plate-shaped member made of an electrically conductive material (for example, metal, etc.). The bus bar 91 is directly or indirectly electrically connected to the stator 40. The driving current is supplied from an external power supply or the like to the stator 40 through the bus bar 91. Although not shown in the drawings, according to this preferred embodiment, the plurality of bus bars 91 is mounted to the stator 40. For example, if the motor is a three-phase motor, at least three bus bars 91 are attached to the stator 40. According to a difference in coil wiring methods, the number of bus bars 91 may be properly changed to, for example, 4 or higher. Each bus bar 91 is disposed in the bus bar holder 61. As illustrated in FIG. 1, one end of the bus bar 91 protrudes from the bottom surface of the power-supply opening 63a. One end of the bus bar 91 is exposed outside of the cover 22. For example, the external power supply is preferably connected to one end of the bus bar 91 exposed outside the cover 22.

As illustrated in FIG. 4, the plurality of bus bars 91 include coil connection portions 91a, 91b, 91c, 91d, 91e, and 91f. The coil connection portions 91a-91f are disposed at the other end of the plurality of bus bars 91. The coil connection portions 91a-91f protrude from the main body-portion inner surface 62b. In more detail, the coil connection portions 91a-91f protrudes from the inner surface of the arc portion 68a of the main-body-portion inner surface 62b toward the radially inner side.

As illustrated in FIG. 1, the end of the rear side (+Z side) of the coil connection portion 91c is located at the rear side ahead of the circuit board front surface 71b. At least a portion of the coil connection portion 91c overlaps with the circuit board 71 in the radial direction. The coil connection portion 91c is electrically connected to the coil 43 through a connection member (not shown). Accordingly, the bus bar 91 is electrically connected to the stator 40. In the above-mentioned description, the coil connection portions 91a, 91b, and 91d-91f are preferably identical in structure to the coil connection portion 91c, and as such a detailed description thereof will herein be omitted.

The wiring member 92 is fixed to the bus bar holder 61. A portion of the wiring member 92 is buried in the bus bar holder 61. The wiring member 92 electrically connects the external power supply (not shown) to the circuit board 71. The wiring member 92 includes the external power-supply connection terminal 94 and the circuit board connection terminal 95. The external power-supply connection terminal 94 and the circuit board connection terminal 95 is exposed from the bus bar holder 61.

The external power-supply connection terminal 94 is disposed in the connector portion 63. The external power-supply connection terminal 94 protrudes from the bottom surface of the power-supply opening 63a. The external power-supply connection terminal 94 is electrically connected to the external power supply (not shown).

As illustrated in FIG. 2, the circuit board connection terminal 95 protrudes from the holding portion inner surface 64a. The circuit board connection terminal 95 preferably includes a first terminal portion 95a, a second terminal portion 95b, a third terminal portion 95c, a fourth terminal portion 95d, and a plate-shaped portion 95e.

The first terminal portion 95a protrudes toward the radially inner side from the holding portion inner surface 64a. The first terminal portion 95a is located at the outside of the radial direction ahead of the circuit board 71. The second terminal portion 95b extends from the end of the inner side of the radial direction of the first terminal portion 95a toward the rear side (+Z side). The second terminal portion 95b extends to a further rear side ahead of the circuit board rear surface 71a.

The third terminal portion 95c extends from the end of the rear side (+Z side) of the second terminal portion 95b toward the radially inner side. The fourth terminal portion 95d extends from the third terminal portion 95c to the front side (−Z side).

The plate-shaped portion 95e extends from the end of the front side of the fourth terminal portion 95d toward the radially inner side. The plate-shaped portion 95e is disposed at the end of the radially inner side of the circuit board connection terminal 95. The plate-shaped portion 95e preferably includes a connection surface 95f parallel or substantially parallel to the circuit board rear surface 71a at the front side. The connection surface 95f contacts the circuit board rear surface 71a. Although not shown in the drawings, the plate-shaped portion 95e is preferably fixed to the circuit board 71 by, for example, soldering. Therefore, the circuit board connection terminal 95 is electrically connected to the circuit board 71. That is, the wiring member 92 is electrically connected to the circuit board 71.

In this preferred embodiment, as illustrated in FIG. 4, the circuit board connection terminal 95 and the coil connection portions 91a~91f is located at different positions in the circumferential direction (θZ direction) of the center axis J.

As illustrated in FIG. 1, the front side O-ring 81 is preferably disposed in the housing 21. The front side O-ring 81 is fixed to the O-ring holding portion 62e. The front side O-ring 81 comes in contact with the inner surface of the housing 21 and the outer surface of the main body portion 62 over its circumference. That is, the front side O-ring 81 preferably contacts the main body portion 62 and the housing 21 over its circumference. Stress generated from the inner surface of the bus bar assembly insertion portion 21a is loaded on the front side O-ring 81.

The rear side O-ring 82 is disposed in the cover 22. The rear side O-ring 82 is fitted into the groove portion 62f. The cover 22 to be described later includes a cover front surface 22c at the front side (−Z side) of the cover portion 22b. The entire circumference of the rear side O-ring 82 preferably contacts the cover front surface 22c to be described later. Stress generated from the cover front surface 22c is loaded on the rear side O-ring 82.

In this preferred embodiment, the front side O-ring 81 and the rear side O-ring 82 may preferably be made of, for example, resin material including silicon rubber or the like. In this case, the front side O-ring 81 and the rear side O-ring 82 are preferably manufactured by, for example, machining elongated silicon rubber having a round cross section in a ring shape. However, a configuration and a material of the front side O-ring 81 and the rear side O-ring 82 are not limited thereto.

The cover 22 is attached to the rear side (+Z side) of the housing 21. The cover 22 is preferably made of, for example, metal. Specifically, the cover 22 is made of, for example, aluminum (Al) or an iron alloy such as SUS. As described above, the cover 22 preferably includes a cylindrical portion 22*a*, the cover 22 preferably includes a cylindrical portion 22*a*, a cover portion 22*b*, a cover front surface 22*c*, and a rear side flange portion 24.

The cylindrical portion 22*a* is opened toward the front side (−Z side). The cylindrical portion 22*a* encloses the bus bar assembly 60 from the radially outer side of the center axis J. In more detail, the cylindrical portion 22*a* encloses the end of the rear side (+Z side) of the main body portion 62 from the radially outer side of the center axis J. In other words, at least a portion of the end of the rear side (+Z side) of the main body portion 62 is disposed in the cylindrical portion 22*a*. The cylindrical portion 22*a* is connected to the end of the rear side (+Z side) of the bus bar assembly insertion portion 21*a* through the front side flange portion 23 and the rear side flange portion 24.

The cover portion 22*b* is connected to the end of the rear side (+Z side) of the cylindrical portion 22*a*. In the present preferred embodiment, the cover portion 22*b* preferably has a flat plate shape. The cover portion 22*b* includes a cover front surface 22*c* at the front side (−Z side). The cover portion 22*b* closes the opening 62*a*. That is, the cover portion 22*b* covers the rear side of the opening 62*a*. The cover front surface 22*c* contacts the entire circumference of the rear side O-ring 82. Therefore, the cover 22 indirectly contacts the main body rear surface 62*c* through the rear side O-ring 82 over one circumferential round of the opening 62*a*.

The rear side flange portion 24 extends from the end of the front side (−Z side) of the cylindrical portion 22*a* toward the radially outer side. At least a portion of the front side flange portion 23 and at least a portion of the rear side flange portion 24 are bonded to each other while overlapping with each other, such that the housing 21 is bonded to the cover 22.

The external power supply, for example, is connected to the motor 10 through the connector portion 63. The bus bar 91 protrudes from the bottom surface of the power-supply opening 63*a*. The connected external power supply is electrically connected to the bus bar 91 and the wiring member 92. Therefore, the driving current is supplied from the external power supply to the coil 43 and the rotation sensor 72 through the bus bar 91 and the wiring member 92. The rotation sensor 72 detects the magnetic flux of the rotor magnet. The driving current supplied to the coil 43 is controlled depending on the rotating position of the rotor 30 calculated based on, for example, the detected magnetic flux of the rotor magnet. When the driving current is supplied to the coil 43, a magnetic field is generated in the coil 43. In other words, when the driving current is supplied to the coil 43, a torque is generated between the rotor 30 and the stator 40. With this torque, the rotor 30 and the shaft 31 rotates. By doing so, the motor 10 obtains a rotational driving force.

The present preferred embodiment improves the responsiveness of the motor and productivity of the motor. A detailed description thereof will hereinafter be given.

If the main surface of the circuit board is parallel or substantially parallel to the axial direction, a thickness of the axial direction of the motor may increase by a thickness of the circuit board. In addition, if the circuit board is arranged as described above, the rotation sensor is attached to the main surface of the circuit board. In this case, it is impossible for a plurality of rotation sensors to be arranged to face the sensor magnet. Therefore, the rotation sensor needs to be connected to the circuit board through the terminal, and also needs to be spaced apart from the circuit board. However, according to this structure, an arrangement accuracy of the rotation sensor with respect to the sensor magnet will be deteriorated, resulting in reduction of responsiveness of the motor.

In the present preferred embodiment, the main surface of the circuit board 71 intersects with the center axis J. The rotation sensor 72 attached to the circuit board 71 faces the sensor magnet 73*b* in the axial direction. Therefore, increasing the axial thickness of the motor 10 is able to be significantly reduced or prevented. The circuit board front surface 71*b* is parallel or substantially parallel to a cross section of the rear side of the sensor magnet 73*b*. As a result, the plurality of rotation sensors 72 are able to be correctly arranged parallel or substantially parallel to the sensor magnet 73*b*. As a result, responsiveness of the motor 10 is improved.

The rotation sensor 72 detects a change in magnetic field caused by the sensor magnet 73*b*. Therefore, preferably, the rotation sensor 72 is spaced apart from the rotor magnet 33. In accordance with the present preferred embodiment, the rotation sensor 72 preferably faces the rear side of the sensor magnet 73*b* in the axial direction. Therefore, as compared to a case in which the rotation sensor 72 faces the sensor magnet 73*b* in the radial direction, the axial distance between the rotation sensor 72 and the rotor magnet 33 is able to be increased. By doing so, detection accuracy of the rotation sensor 72 is increased, and responsiveness of the motor 10 also is increased.

If the rotation sensor is arranged to face the sensor magnet in the axial direction, the axial distance between the circuit board and the stator will be increased. As a result, the circuit board is located at the rear side ahead of the coil connection portion. In this case, the coil connection portion is connected to a coil of the stator through the opening of the main body portion. As a result, it is difficult to interconnect the coil connection portion and the coil with the circuit board support portion or the like. Therefore, a long period of time is consumed when assembling the motor, such that productivity of the motor may be reduced.

However, according to the present preferred embodiment, the end of the rear side of the coil connection portions 91*a*-91*f* preferably is located at the rear side ahead of the circuit board front surface 71*b*. Therefore, the coil connection portions 91*a*-91*f* is easily connected to the coil 43. As a result, productivity of the motor 10 is significantly improved.

As described above, the motor 10 according to this preferred embodiment improves responsiveness and productivity of the motor.

In accordance with the present preferred embodiment, at least a portion of the coil connection portions 91*a*-91*f* overlaps with the circuit board 71 in the radial direction, such that the axial thickness of the motor 10 is reduced.

Respective components of the motor 10 are provided at suitable positions on the basis of various aspects, for example, motor miniaturization in the axial direction, improved responsiveness of the motor, and facilitated assembling of the motor (i.e., improved productivity of the motor), etc. A detailed description thereof will hereinafter be given.

In the present preferred embodiments, the connection portions 66a-66d are preferably located at the rear side ahead of the end of the front side of the rear bearing holding portion 65. Therefore, if the main body portion 62 encloses the end of the rear side of the stator 40, the connection portions 66a-66d approach the stator 40, and at the same time a portion of the rear bearing holding portion 65 is able to be located to overlap the stator 40 in the radial direction. In the present preferred embodiment, a portion of the front side of the rear bearing holding portion 65 overlaps with the bobbin 44 in the radial direction.

In the present preferred embodiment, a portion of the front side of the sensor magnet 73b preferably overlaps with the connection portions 66a-66d in the radial direction. Therefore, the rotation sensor 72 and the circuit board 71 may be provided close to the connection portions 66a-66d in the axial direction. At least a portion of the coil connection portions 91a-91f overlaps with the circuit board 71 in the radial direction.

In the present preferred embodiment, the connection portions 66a-66d, the rear bearing holding portion 65, the sensor magnet 73b, the circuit board 71, and the coil connection portions 91a-91f are all preferably provided as described above, such that responsiveness and productivity of the motor is able to be increased and the axial thickness of the motor 10 is able to be reduced.

Respective components of the motor 10 are arranged at suitable positions on the basis of various aspects, for example, motor miniaturization in the axial direction, improved responsiveness of the motor, improved productivity of the motor, etc. As a result, the axial thickness of the motor 10 is able to be reduced, responsiveness of the motor 10 is able to be increased and productivity of the motor 10 is also able to be increased.

In the present preferred embodiment, the circuit board front surface 71b is preferably perpendicular or substantially perpendicular to the center axis J. Therefore, the axial thickness of the motor 10 is able to be reduced. In addition, the rotation sensor 72 is able to be more precisely positioned with respect to the sensor magnet 73b.

According to the present preferred embodiment, the position of the circuit board connection terminal 95 is different from the positions of the coil connection portions 91a-91f in the circumferential direction of the center axis J. Therefore, when the circuit board connection terminal 95 is connected to the circuit board 71, and when the coil connection portions 91a-91f are electrically connected to the coil 43, mutual interference between the circuit board connection terminal 95 and the coil connection portions 91a-91f is able to be significantly reduced or prevented. In addition, such connection is able to be easily carried out.

In the present preferred embodiments, the circuit board connection terminal 95 preferably includes a plate-shaped portion 95e. The connection surface 95f contacts the circuit board rear surface 71a. Therefore, a contact region between the circuit board 71 and the circuit board connection terminal 95 may be increased in size. In addition, the circuit board connection terminal 95 and the circuit board 71 is able to be stably fixed.

In the present preferred embodiment, a hall element is preferably used as the rotation sensor 72, such that production costs of the motor 10 are reduced. However, it is also possible to use other types of position sensors such as resolvers, encoders, etc.

In the present preferred embodiment, the rear side O-ring 82 is preferably disposed on the main body rear surface 62c. Therefore, sealability between the bus bar holder 61 and the cover 22 is improved.

A preferred embodiment of the present invention may include the following elements.

The entirety of the rear bearing holding portion 65 may overlap with the stator 40 in the radial direction. Alternatively, at least a portion of the rear bearing holding portion 65 may overlap with the stator 40 in the radial direction.

In the axial direction, the end of the front side of the connection portions 66a-66d may be identical in position to the end of the front side of the rear bearing holding portion 65. Alternatively, the end of the front side of the rear bearing holding portion 65 may be located at the rear side ahead of the connection portions 66a-66d.

The main surface of the circuit board 71, i.e., the circuit board rear surface 71a and the circuit board front surface 71b, may not be perpendicular or substantially perpendicular to the axial direction. The coil connection portions 91a-91f may not overlap with the circuit board 71 in the radial direction. That is, the entirety of the coil connection portions 91a-91f may be located at the rear side ahead of the circuit board rear surface 71a.

As described above, the sensor magnet 73b is preferably indirectly fixed to the shaft 31 through the sensor magnet holding portion 73a. However, the sensor magnet holding portion 73a may not be provided such that the sensor magnet 73b may be directly fixed to the shaft 31. That is, the sensor magnet 73b is directly or indirectly fixed to the shaft 31 at the rear side of the second bearing 52.

The entirety of the sensor magnet 73b may overlap with the connection portions 66a-66d in the radial direction. Alternatively, at least a portion of the sensor magnet 73b may overlap with the connection portions 66a-66d in the radial direction.

As described above, the circuit board 71 is preferably located at the rear side of the shaft 31. However, the shaft 31 is inserted into the through-hole defined in the circuit board 71. The end of the rear side of the shaft 31 may protrude toward the rear side of the circuit board 71.

As described above, the rear side O-ring 82 is preferably used to seal a gap between the cover 22 and the bus bar holder 61. However, a liquid gasket or the like may be disposed between the cover 22 and the bus bar holder 61. The liquid gasket or the like is preferably used to seal the gap between the housing 21 and the bus bar holder 61. That is, the liquid gasket or the like may be disposed between the housing 21 and the bus bar holder 61.

If the liquid gasket is used to seal the gap between the cover 22 and the bus bar holder 61, the cover 22 directly contacts the main body rear surface 62c over the entire circumference of the opening 62a. That is, the cover 22 directly or indirectly contacts the main body rear surface 62c over the entire circumference of the opening 62a.

A motor according to a second preferred embodiment of the present invention preferably includes a magnetoresistive element defining and functioning as a rotation sensor, differently from the motor of the first preferred embodiment. Further, in the following description, the same components as those of the first preferred embodiment are denoted with the same reference numbers and therefore the description thereof may be omitted.

Figure 5:
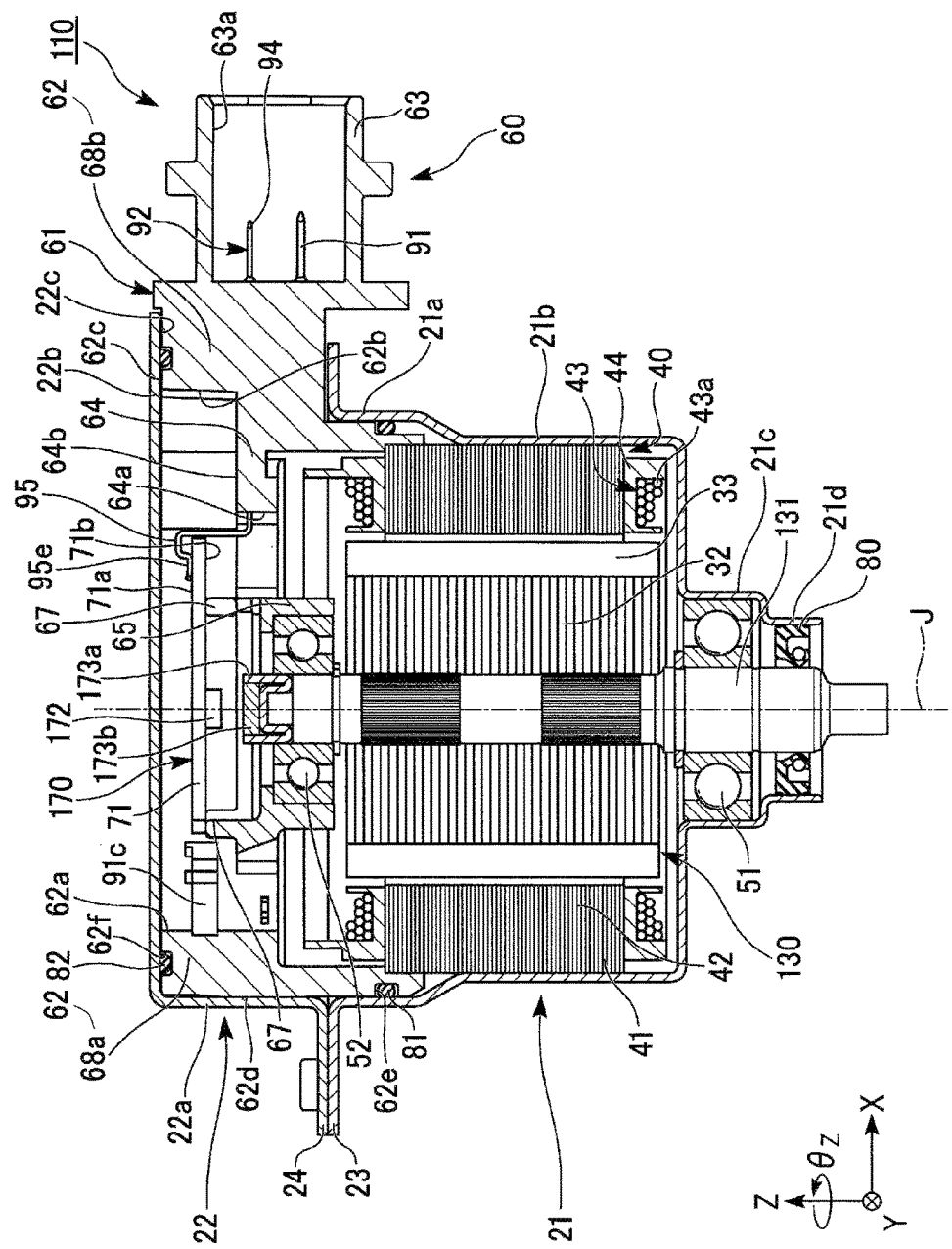
FIG. 5 is a cross-sectional view illustrating a motor according to a second preferred embodiment of the present invention.

FIG. 5 is a cross-sectional view illustrating the motor 110 according to this preferred embodiment. As illustrated in FIG. 5, the motor 110 preferably includes a housing 21, a cover 22, a rotor 130, a stator 40, a controller 170, a bus bar assembly 60, a front side O-ring 81, and a rear side O-ring 82. The rotor 130 has a shaft 131.

The axial thickness of the shaft 131 may be less than a thickness of the shaft 31 (Z-axis direction) of the first preferred embodiment. The axial thickness of a specific portion fitted into the second bearing 52 of the shaft 131 is less than the axial thickness of the corresponding portion of the shaft 31 of the first preferred embodiment. The rotor 130 is preferably identical in structure to the rotor 30 of the first preferred embodiment, excepting different structures of the shaft 131.

The controller 170 includes the circuit board 71, the rotation sensor 172, the sensor magnet holding portion 173a, and the sensor magnet 173b. That is, the motor 110 preferably includes the circuit board 71, the rotation sensor 172, the sensor magnet holding portion 173a, and the sensor magnet 173b.

The rotation sensor 172 preferably is a magnetoresistive element. The rotation sensor 172 is attached to the circuit board front surface 71b. The rotation sensor 172 faces the sensor magnet 173b in the axial direction (Z-axis direction).

The sensor magnet holding member 173a is a cylindrical member including a bottom surface, the cylindrical member being opened toward the rear side (+Z side). A concave portion which is concave toward the rear side is located at the bottom portion of the sensor magnet holding portion 173a. The concave portion of the sensor magnet holding portion 173a is fitted into a small-diameter portion located at the end of the rear side (+Z side) of the shaft 131. By doing so, the sensor magnet holding portion 173a is attached to the shaft 131. The sensor magnet holding portion 173a is fixed to the shaft 131 so that the sensor magnet holding portion 173a rotates along with the shaft 131.

A portion of the front side (−Z side) at the outer surface of the sensor magnet holding portion 173a is fitted into the second bearing 52. That is, a portion of the front side of the sensor magnet holding portion 173a overlaps with the second bearing 52 in the radial direction.

The sensor magnet 173b may have an annular or substantially annular shape. An N pole and an S pole are preferably alternately disposed in the circumferential direction. The sensor magnet 173b is fixed to the end of the rear side of the sensor magnet holding portion 173a. The outer circumferential surface of the sensor magnet 173b is fitted into the sensor magnet holding portion 173a. The remaining structures other than the above-mentioned elements of the motor 110 are preferably identical to the structure of the motor 10 of the first preferred embodiment.

In the present preferred embodiment, because the rotation sensor 172 is a magnetoresistive element, a resolution of the rotation sensor 172 is able to be increased, and responsiveness of the motor 110 is also able to be increased as compared to a device which uses a Hall sensor.

As shown in FIG. 5, if the magnetoresistive element is used as the rotation sensor 172, the sensor magnet 173b is located at the rear side of the shaft 131. Therefore, the entire thickness of the motor 110 may be easily increased. However, according to the present preferred embodiment, a portion of the front side of the sensor magnet holding portion 173a overlaps with the radial direction of the second bearing 52. Therefore, the sensor magnet 173b may be positioned close to the second bearing 52. Therefore, the axial thickness of the motor 110 is able to be reduced.

The entirety of the sensor magnet holding portion 173b may overlap with the second bearing 52 in the radial direction. That is, at least a portion of the sensor magnet holding portion 173b may overlap with the second bearing 52 in the radial direction.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor, comprising:
a rotor including a shaft with a center on a center axis extending in one direction toward both a first side and a second side;
a stator enclosing the rotor and rotating the rotor about the center axis;
a first bearing located at a first side of the stator in the one direction and supporting the shaft;
a second bearing located at a second side of the stator in the one direction opposite to the first side of the stator and supporting the shaft;
a cylindrical housing holding the stator and the first bearing;
a bus bar assembly holding the second bearing, and allowing an end of a first side of the bus bar assembly to be located in the housing;
a cover fixed to the housing to cover at least a portion of a second side of the bus bar assembly;
a circuit board disposed between the second bearing and the cover in the one direction, and allowing a surface of a second side of the circuit board to cross the one direction;
a sensor magnet directly or indirectly fixed to the shaft at a second side of the second bearing; and
a rotation sensor which is attached to the circuit board, and faces the sensor magnet in the one direction; wherein
the bus bar assembly includes:
a bus bar electrically connected to the stator;
a wiring member electrically connecting an external power supply to the circuit board; and
a bus bar holder holding the bus bar and the wiring member;
the bus bar holder includes:
a cylindrical main body portion including an opening at a second side of the cylindrical main body portion; and
a connector portion protruding from the main body portion toward a radially outer side of the center axis;
the wiring member includes:
an external power-supply connection terminal provided to the connector portion to be electrically connected to the external power-supply; and
a circuit board connection terminal electrically connected to the circuit board;
the bus bar includes a coil connection portion that protrudes from an inner surface of the main body portion and is electrically connected to a coil of the stator;
an end of a second side of the coil connection portion is located ahead of a surface of a first side of the circuit board toward the second side of the circuit board;

the bus bar holder includes a second bearing holding portion that holds the second bearing, and a connection portion that connects the main body portion to the second bearing holding portion;

the connection portion is located at a second side of the connection portion ahead of an end of a first side of the second bearing holding portion; and at least a portion of the sensor magnet overlaps with the connection portion in a radial direction.

2. The motor of claim 1, wherein at least a portion of the coil connection portion overlaps with the circuit board in the radial direction.

3. The motor of claim 1, wherein at least a portion of the second bearing holding portion overlaps with the stator in the radial direction.

4. The motor of claim 1, wherein the surface of the second side of the circuit board is perpendicular or substantially perpendicular to the one direction.

5. The motor of claim 1, wherein the circuit board connection terminal and the coil connection portion are located at different positions in a circumferential direction of the center axis.

6. The motor of claim 1, further comprising:

a sensor magnet holding portion attached to the shaft and holding the sensor magnet;

wherein at least a portion of the sensor magnet holding portion overlaps with the second bearing in the radial direction.

7. The motor of claim 1, wherein:

the circuit board connection terminal includes a plate-shaped portion; and the plate-shaped portion includes a connection surface parallel or substantially parallel to the surface of the second side of the circuit board; wherein the connection surface is in contact with the surface of the second side of the circuit board.

* * * * *